United States Patent [19]

Beckingham

[11] Patent Number: 5,331,720
[45] Date of Patent: Jul. 26, 1994

[54] MANUAL IMPLEMENT HANDLE ATTACHMENT

[76] Inventor: Daryl Beckingham, 631 Nottingham Ave., Winnipeg, Manitoba, R2K 2C4, Canada

[21] Appl. No.: 946,677

[22] Filed: Sep. 18, 1992

[30] Foreign Application Priority Data

Sep. 20, 1991 [CA] Canada ............................ 2051940

[51] Int. Cl.⁵ ........................ A47B 95/02; A47J 45/00; A46B 5/02; A01B 1/22
[52] U.S. Cl. ............................ 16/114 R; 15/144.4; 15/145; 294/58
[58] Field of Search ................ 16/114 R, 125, 115; 294/58, 54.5; 15/144.4, 145

[56] References Cited

U.S. PATENT DOCUMENTS

| | | | |
|---|---|---|---|
| 758,482 | 4/1904 | Smith | 16/114 R |
| 1,151,012 | 8/1915 | Herringstad | 294/58 |
| 1,534,075 | 4/1925 | Parrish | 294/58 |
| 4,105,346 | 8/1978 | Gelinas | 16/115 |
| 4,922,577 | 5/1990 | Unger | 16/115 |
| 5,137,317 | 8/1992 | Bieniek | 294/58 |

Primary Examiner—Carmine Cuda
Attorney, Agent, or Firm—Murray E. Thrift; Adrian D. Battison; Stanley G. Ade

[57] ABSTRACT

An auxiliary handle is provided for manual implements like rakes and brooms. The handle has a lateral arm with one end pivotally connected to the implement handle by a clamp and the opposite end connected to an upright second arm, which is in turn pivotally connected to the implement handle by a clamp. The upright second arm is telescopically adjustable in length to allow the system to be adjusted to suit most any implement configuration and personal stature. The lateral arm is also preferably telescopically adjustable. It carries one or more hand grips.

12 Claims, 2 Drawing Sheets

MANUAL IMPLEMENT HANDLE ATTACHMENT

FIELD OF THE INVENTION

The present invention relates to implement handles and more particularly to auxiliary handles for manual implements with elongate handles, for example rakes or brooms.

BACKGROUND

In the use of such manual implements as push brooms, rakes and others with long, straight handles, it is often necessary for the user to adopt a posture or a hand grip that is uncomfortable and difficult to maintain for any length of time. While several attempts have been made in the past to provide auxiliary handle system on shovels to assist in lifting loads, these handles are not readily adaptable to a range of implements or for use by persons of different statures. They are not especially suited for use with implements where the primary action is not a lifting action but more a sweeping action, as for example with rakes and brooms. There is therefore a need for an apparatus for use with manual implements that is applicable to a wide variety of implements, for example rakes and brooms, for the appropriate manipulation of those implements by most persons.

SUMMARY

According to one aspect of the present invention there is provided an auxiliary handle for a manual implement having a working head and an elongate implement handle, said auxiliary handle comprising:

a lateral first arm with first and second ends;

first clamp means pivotally connected to the first end of the first arm and adapted to be clamped to the implement handle;

an upright second arm with first and second ends, the second arm comprising telescopic means for altering the length of the second arm and lock means for locking the telescopic means for selectively and temporarily fixing the length of the second arm;

pivot means pivotally connecting the second end of the first arm to the second end of the second arm;

second clamp means pivotally connected to the first end of the second arm and adapted to be reasonably secured to the implement handle; and hand grip means mounted on the first arm.

The lateral first arm may be grasped in both hands and moved from side to side in a horizontal movement without twisting or bending of the user's back, thus minimizing strain on the back, the shoulders and the arms.

The clamps and the adjustable, telescopic upright arm of the auxiliary handle allow the lateral arm to be positioned at almost any desired height above the implement head and at most any desired orientation. Thus, regardless of the nature of the implement, the first arm may be positioned at a horizontal orientation and at a level that is comfortable for most any user.

Even greater flexibility is obtained if the first arm is also telescopically adjustable and the hand grip is adjustable along and rotatable with respect to the first arm.

The invention also provides for an implement with the auxiliary handle attached.

BRIEF DESCRIPTION OF THE DRAWINGS

In the accompanied drawings, which illustrate an exemplary embodiment of the present invention.

DETAILED DESCRIPTION

Figures 1, 2:
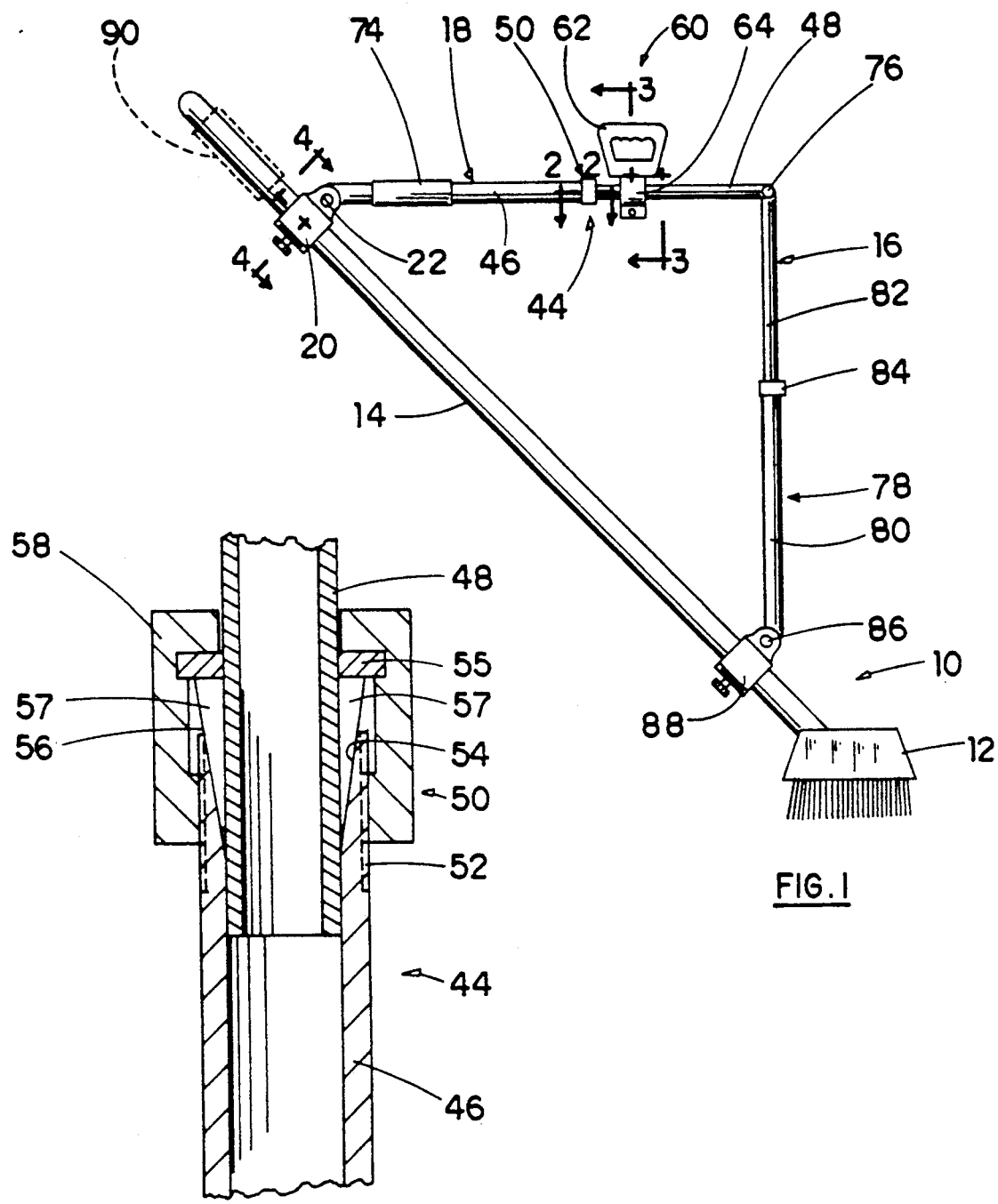
FIG. 1 is an elevation of one embodiment of the invention attached to a broom.
FIG. 2 is a cross section along line 2—2 of FIG. 1.
Figure 3:
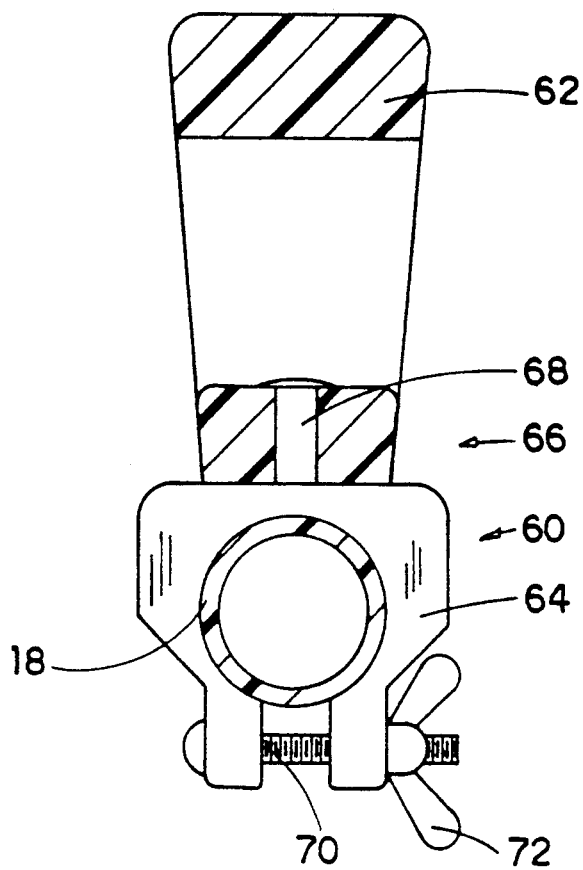
FIG. 3 is a section along line 3—3 of FIG. 1.
Figure 4:
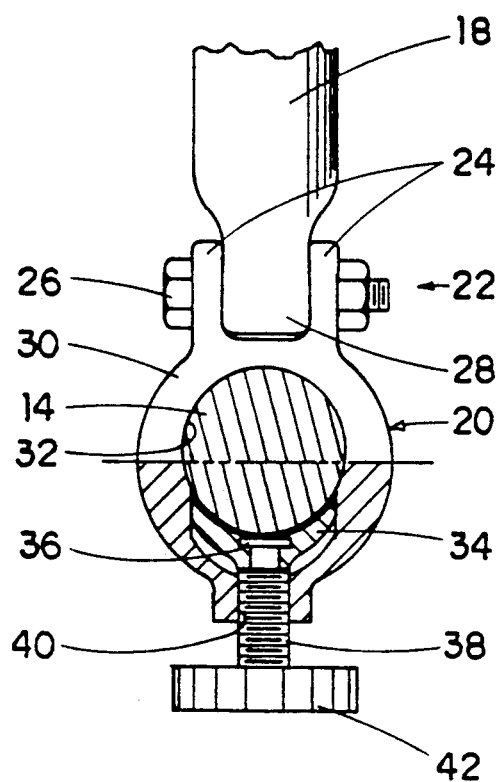
FIG. 4 is a section along line 4—4 of FIG. 1.

Referring to the accompanying drawings, especially to FIG. 1, there is illustrated an implement 10, in this case a broom, having a head 12 and an elongate, cylindrical handle 14 sloping upwardly from the head. Auxiliary handle 16 is mounted on the implement handle 14 to make the implement easier to use.

The auxiliary handle 16 includes a lateral arm 18 affixed to the implement handle 14 by a clamp 20 to which the arm is connected by a pivot 22. The pivot includes a pair of lugs 24 on the clamp and a pin 26 through the lugs and the flattened end 28 of the arm 18, which extends between the two lugs 24. The main body of the clamp is a ring 30 with a centre opening 32 that fits over the implement handle 14. A clamp plate 34 is positioned in the opening on one side and is rotatable on a stud 36 fastened to the end of a screw 38 engaged in a radial threaded bore 40 in the ring 30. The screw 38 has a knurled head 42 so that it can be turned by hand.

The arm 18 includes a telescopic joint 44. This includes an outer tube 46 and an inner tube 48 sliding in the outer tube. A lock 50 locks the tubes together at any desired position.

The lock 50 includes a thread 52 on the outer end of the outer tube 46 and an inwardly tapering bevel 54 on the inner surface of that tube. A ring 55 slides on the inner tube, beyond the end of the outer tube and has a bevelled end 56 confronting the bevel 54 on the outer tube. The bevelled end is divided by a series of axial slots into a set of wedges 57. A thimble 58 engages over the ring 55 and is threaded onto the end of the outer tube. By turning the thimble onto the outer tube, the ring 55 is forced into the bevelled end of the outer tube, which forces the wedges 57 into frictional engagement with the inner tube, thus locking the inner and outer tubes together.

The arm 18 also carries a hand grip 60. The grip includes a hand loop 62 mounted on a clamp 64 by a pivot 66. The pivot includes a stud 68 fixed to the clamp and extending through a hole in the handle loop. The clamp is a resilient split clamp that is fastened to the arm 18 by a screw 70 and a wing nut 72 for drawing the arms of the clamp together around the arm 18.

Also mounted on the arm 18 is a tubular grip 74. This is a tube of resilient material that provides a comfortable hand grip for a user.

The end of the arm 18 opposite the clamp 20 is connected by a pivot pin 76 to a second arm 78 that extends vertically downwards from the pivot. The second arm is also telescopically adjustable using a telescopic coupling between an outer tube 80 and an inner tube 82 with a lock 84 that is the same as the lock 50 of the first arm. At the lower end of the arm 78 it is fastened by pivot 86 to a clamp 88 that is the same as clamp 20 previously described. The clamp 88 is fastened on the implement handle 14.

With the implement handle described above, it is possible to adjust the handle to suit almost any implement to any person. It is simply necessary to release the two locks 50 and 84, to fit the clamps 20 and 88 onto the implement handle and then to adjust the arm lengths and clamp positions to those desired by the user. With the push broom implement illustrated and the first arm horizontal, the first arm may be gripped in both hands and a sweeping action produced by a simple horizontal movement of the hands. It is no longer necessary for the user to bend over to place one of the hands on a sloping handle at a lower position than the other. The rotatable loop handle may be attached to the first arm and oriented as desired for the comfort of the user.

Where desired, the implement handle 14 may be equipped with an auxiliary hand grip 90 at its upper end. This may be a resilient tube much like the grip 74 on the lateral arm of the auxiliary handle.

While one embodiment of the present invention has been described in the foregoing, it is to be understood that other embodiments are possible within the scope of the invention. The invention is to be considered limited solely by the scope of the appended claims.

What is claimed is:

1. An auxilliary handle for a manual implement having a working head and an elongate implement handle, said auxiliary handle comprising:
   a lateral first arm with first and second ends;
   first clamp means pivotally connected to the first end of the first arm and adapted to be clamped to the implement handle;
   an upright second arm with first and second ends, the second arm comprising two tubes telescopically engaged for altering the length of the second arm and lock means for selectively and temporarily fixing the length of the second arm, the lock means comprising a friction clamp with at least one friction member selectively engageable to prevent relative telescopic movement of the tubes;
   pivot means pivotally connecting the second end of the first arm to the second end of the second arm;
   second clamp means pivotally connected to the first end of the second arm and adapted to be releasably secured to the implement handle; and
   hand grip means mounted on the first arm between the pivot means and the first clamp means.

2. An auxiliary handle according to claim 1 wherein the first arm comprises two tubes telescopically engaged for altering the length of the first arm and lock means for selectively and temporarily fixing the length of the second arm, the lock means comprising a friction clamp with at least one friction member selectively engageable to prevent relative telescopic movement of the tubes.

3. An auxiliary handle according to claim 2 wherein the hand grip means comprise a handle loop and handle clamping means for releasably clamping the handle loop to the first arm.

4. An auxiliary handle according to claim 3 wherein the hand grip means include pivot means for pivotally mounting the handle loop on the handle clamp means.

5. An auxiliary handle according to claim 4 wherein the hand grip means further include a substantially tubular element mounted on the first arm.

6. An auxiliary handle according to claim 5 further including tubular grip means for engagement on the implement handle.

7. A manual implement comprising:
   a working head;
   an elongate implement handle;
   an auxiliary handle mounted on the implement handle, said auxiliary handle comprising:
   a lateral first arm with first and second ends;
   first clamp means pivotally connected to the first end of the first arm and clamped to the implement handle;
   an upright second arm with first and second ends, the second arm comprising two tubes telescopically engaged for altering the length of the second arm and lock means for selectively and temporarily fixing the length of the second arm, the lock means comprising a friction clamp with at least one friction member selectively engageable to prevent relative telescopic movement of the tubes;
   pivot means pivotally connecting the second end of the first arm to the second end of the second arm;
   second clamp means pivotally connected to the first end of the second arm and clamped to the implement handle; and
   hand grip means mounted on the first arm between the pivot means and the first clamp means.

8. A manual implement according to claim 7 wherein the first arm comprises two tubes, telescopically engaged for altering the length of the first arm and lock means for selectively and temporarily fixing the length of the second arm, the lock means comprising a friction clamp with at least one friction member selectively engageable to prevent relative telescopic movement of the tubes.

9. A manual implement according to claim 8 wherein the hand grip means comprise a handle loop and handle clamping means for releasably clamping the handle loop to the first arm.

10. A manual implement according to claim 9 wherein the hand grip means include pivot means for pivotally mounting the handle loop on the handle clamp means.

11. A manual implement according to claim 9 wherein the hand grip means further include a substantially tubular element mounted on the first arm.

12. A manual implement according to claim 11 further including tubular grip means for engagement on the implement handle.

* * * * *